(12) United States Patent
Hunter et al.

(10) Patent No.: US 6,515,275 B1
(45) Date of Patent: Feb. 4, 2003

(54) METHOD AND APPARATUS FOR DETERMINING THE ILLUMINATION TYPE IN A SCENE

(75) Inventors: Susan Hunter, Fort Collins, CO (US); Paul M Hubel, Mt View, CA (US)

(73) Assignee: Hewlett-Packard Company, Palo Alto, CA (US)

(*) Notice: Subject to any disclaimer, the term of this patent is extended or adjusted under 35 U.S.C. 154(b) by 0 days.

(21) Appl. No.: 09/556,231

(22) Filed: Apr. 24, 2000

(51) Int. Cl.⁷ .................................................. G01I 3/46
(52) U.S. Cl. ........................................ 250/226; 396/231
(58) Field of Search ........................... 250/208.1, 208.2, 250/226, 339.05; 348/164, 166, 272, 273, 277; 396/231, 225

(56) References Cited

U.S. PATENT DOCUMENTS

| | | | | |
|---|---|---|---|---|
| 5,710,948 A | * | 1/1998 | Takagi | 396/50 |
| 6,201,932 B1 | * | 3/2001 | Tsujimoto | 396/225 |
| 6,211,521 B1 | * | 4/2001 | Bawolek et al. | 250/339.02 |

* cited by examiner

Primary Examiner—Robert H. Kim
Assistant Examiner—Hoon K. Song
(74) Attorney, Agent, or Firm—Steven L. Webb

(57) ABSTRACT

A method and apparatus for determining the illuminant type in a digital image. A photo sensor that has an array of photo-cells that detect non-visible light, embedded in the array of photo-cells that detect only visible light is disclosed. Using the visible light photo-cells in conjunction with the non-visible photocells, the type of illuminant for the scene can be determined.

5 Claims, 10 Drawing Sheets

| G | B | G | B | G | B | G | B |
|---|---|---|---|---|---|---|---|
| R | G | R | G | R | G | R | G |
| G | B | G | B | G | B | G | B |
| R | G | R | G | R | G | R | G |

FIG.4

Prior Art

| G | B | G | B | G | B | G | B |
|---|---|---|---|---|---|---|---|
| R | I | R | I | R | I | R | I |
| G | B | G | B | G | B | G | B |
| R | I | R | I | R | I | R | I |

FIG.5

METHOD AND APPARATUS FOR DETERMINING THE ILLUMINATION TYPE IN A SCENE

FIELD OF THE INVENTION

The present invention relates generally to digital cameras and more specifically to a digital camera that has a photo sensor that has an array of photo-cells that detect non-visible light, embedded in the array of photo-cells that detect only visible light. Using the visible light photocells in conjunction with the non-visible photocells, the digital camera can determine the type of illuminant for the scene.

BACKGROUND OF THE INVENTION

When capturing an image with a digital camera, the source of the illumination for the scene affects the colors captured with the camera. For indoor scenes the illumination source can vary widely and can include a tungsten bulb, halogen lamps, fluorescent lamps, sunlight coming in through a window, or even a xenon light. Each of these types of light sources has a different spectral energy distribution. The types of light sources that create light using a filament glowing at a high temperature (for example tungsten bulbs) are typically characterized by a color temperature defined as a Planckian radiator with a temperature of 50 degrees higher than the filament of the light (see FIG. 1). The sun can also be characterized as a Planckian radiator but the loss of some wavelengths through scattering and absorption in the atmosphere causes significant differences from the Plankian radiator at those wavelengths. Because of the variation in the spectral power distribution of the sun, standard spectral power distribution curves have been developed. One of the standard curves is called D65 corresponding to a color temperature of 6500K (see FIG. 2). Clouds in the sky can also affect the spectral distribution of energy reaching the scene from the sun. The time of day also affects the color temperature of the sun (noon vs. sunrise). The color temperature can be affected by whether the object is in direct sun light or in shadows.

The types of light sources that excite a phosphor layer that then fluoresces (for example fluorescent lamps and xenon lamps) tend to have spectral distributions that are unique to the phosphors in the lamp (see FIG. 3) in combination with the mercury vapor spectrum.

Each of these light sources has a different spectral power distribution that affects the colors captured in a scene by a camera. For example when you have a white object illuminated by a tungsten bulb the white object will appear yellow in the scene captured by the camera. This is because the tungsten bulb does not produce much blue light. A white object is an object that reflects a similar amount of the red, green and blue light that hits the object. When a white object is illuminated by a tungsten bulb more red light is hitting the object than blue light and therefore more red light is reflected, causing the object to look yellow to the camera. The human eye adjusts to different illuminates and compensates for the color shift but a camera records the actual light in the scene.

Fortunately these color shifts caused by the illumination source can be corrected. This correction is typically called white balancing. For proper white balancing the illuminant of the scene must be known. There are a number of methods currently used to try to determine the scene illuminant to be used in white balancing.

One method looks for the brightest point in a scene and assumes that it should be white. The brightest point is then adjusted until it is white and then this adjustment is used to balance the rest of the scene. This method operates on the assumption that the brightest point in a scene is from a white object or from a specular reflection. For example the specular reflection coming from a car windshield. Obviously not all scenes have the brightest point as a specular reflection or a white object. When this method is used on a scene with a non-white object that is the brightest point in the scene it can result in significant color miss-match. Another method of white balancing adjusts the image until the sum of all the areas in the image adds up to a neutral gray. Both of these methods operate on assumptions about the content of the scene.

Another method uses a correlation matrix memory to map the image data onto color image data under a number of different illuminants. This method is described in U.S. Pat. No. 6,038,399 that is hereby incorporated by reference. When using this method the image data needs to be mapped onto the color data for all potential illuminants. Mapping the image data onto each of the potential illuminants is a computational process. If the set of potential illuminants could be narrowed to the type of illuminant (for example daylight) the amount of computation, and therefore the speed could be reduced. Therefore there is a need for a system that can determine the illumination type for an image in a scene.

SUMMARY OF THE INVENTION

A method of determining the illuminant type in an image. Using visible light photocells in conjunction with non-visible or Infered photocells, a digital camera can determine the type of illuminant for the scene.

Other aspects and advantages of the present invention will become apparent from the following detailed description, taken in conjunction with the accompanying drawings, illustrating by way of example the principles of the invention.

BRIEF DESCRIPTION OF THE DRAWINGS

FIG. 4 is a prior art drawing of the typical layout of the red, green, and blue filter placement on area photo sensor arrays.

FIG. 5 is a drawing of the layout of the red, green, blue, and IR filter placement on an area photo sensor array in accordance with the present invention.

DETAILED DESCRIPTION OF THE PREFERRED EMBODIMENT

A system that can determine the illumination type or class for an image in a scene can greatly reduce the time and computation necessary to determine the actual illuminant for the scene. This allows for the rapid white balancing of a scene with the correct illuminant.

Photo sensor arrays used in digital cameras typically contain red, green, and blue filters arranged in a repeating pattern. FIG. 4 show a sample of a typical pattern used in a photo sensor array. For clarity FIG. 4 only shows a subsample of the actual number of photo sensor elements contained in a typical photo sensor array. In the typical layout, the repeating pattern has one red, one blue, and two green photo sensor elements or pixels. These four elements create a super pixel that samples all the visible light in the scene for this area. By replacing one of the green filters with a filter that only allows infrared (IR) light to pass or by leaving off a filter, information about the type of illuminant for the scene can be determined.

FIG. 5 show a sample of the repeating pattern containing a red, green, blue, and IR photo sensor elements in accordance with the current invention. For clarity FIG. 5 only shows a sub-sample of the actual number of photo sensor elements contained in a typical photo sensor array.

Figure 6:
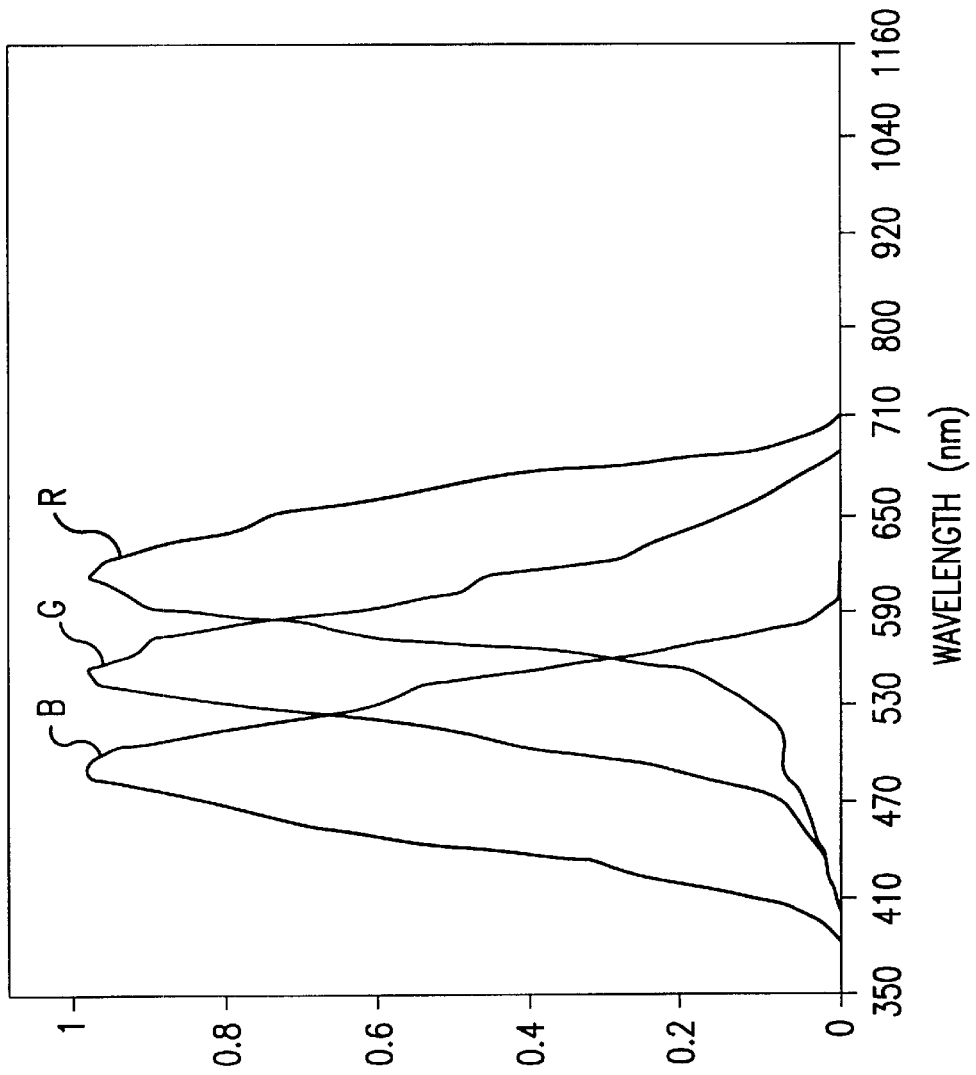
FIG. 6 is a prior art chart of the spectral pass-band filters for the red, green, and blue filters of a typical photo sensor array.
Figure 7:
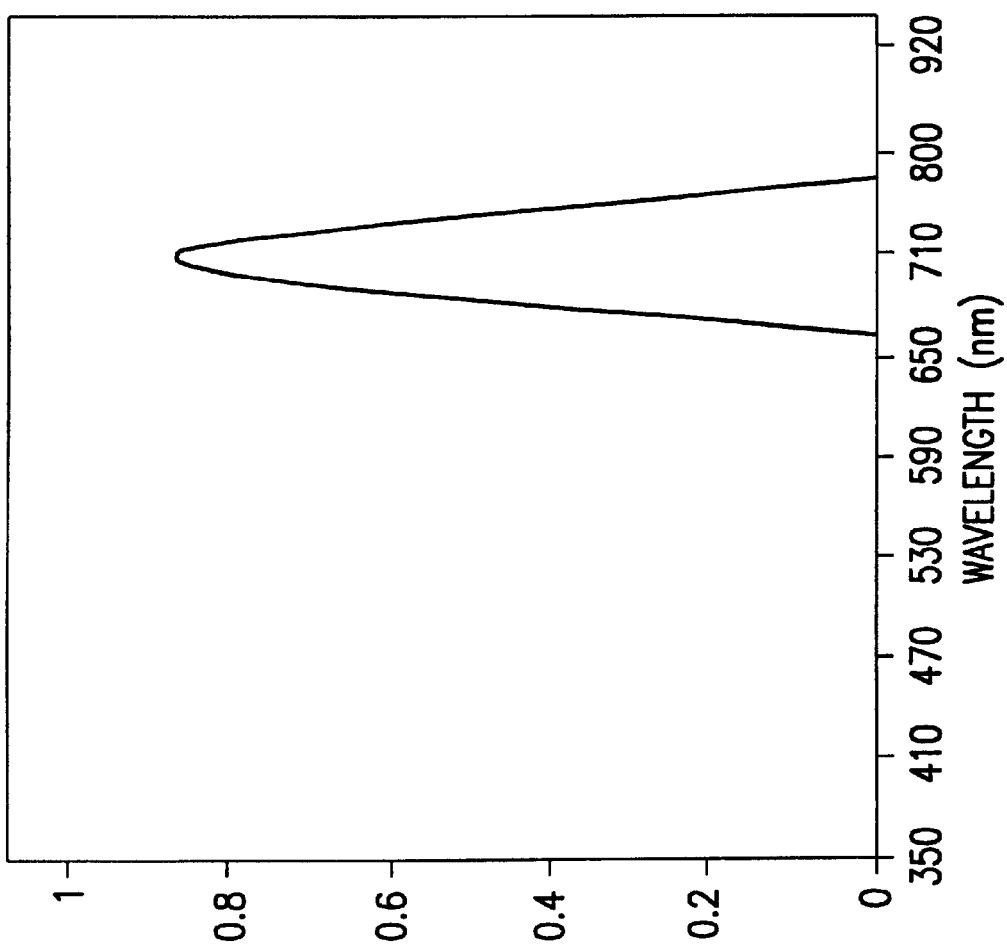
FIG. 7 is a chart of one embodiment of the spectral pass-band filters for the IR filter in accordance with the present invention.
Figure 8:
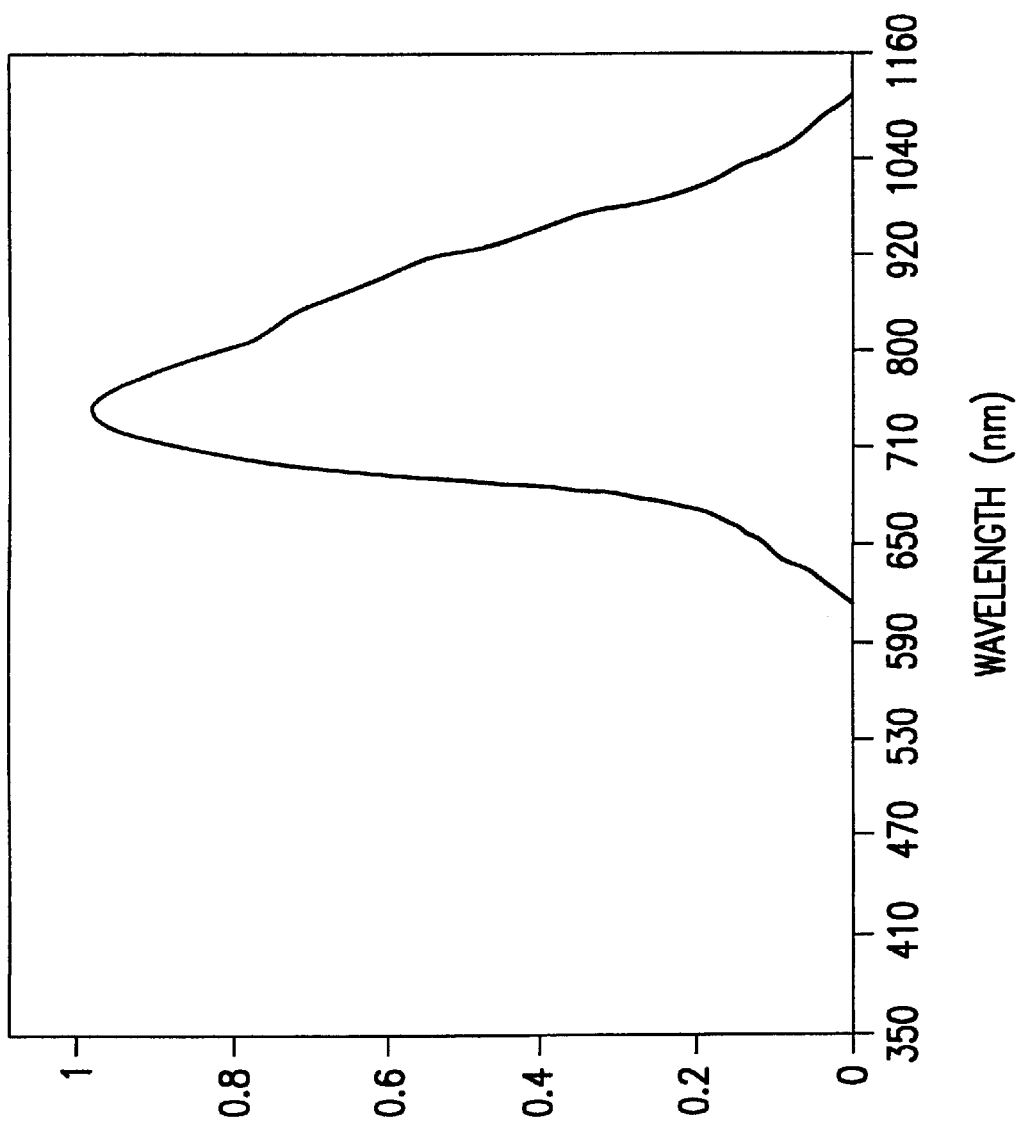
FIG. 8 is a chart of another embodiment of the spectral pass-band filters for the IR filter in accordance with the present invention.
Figure 11:
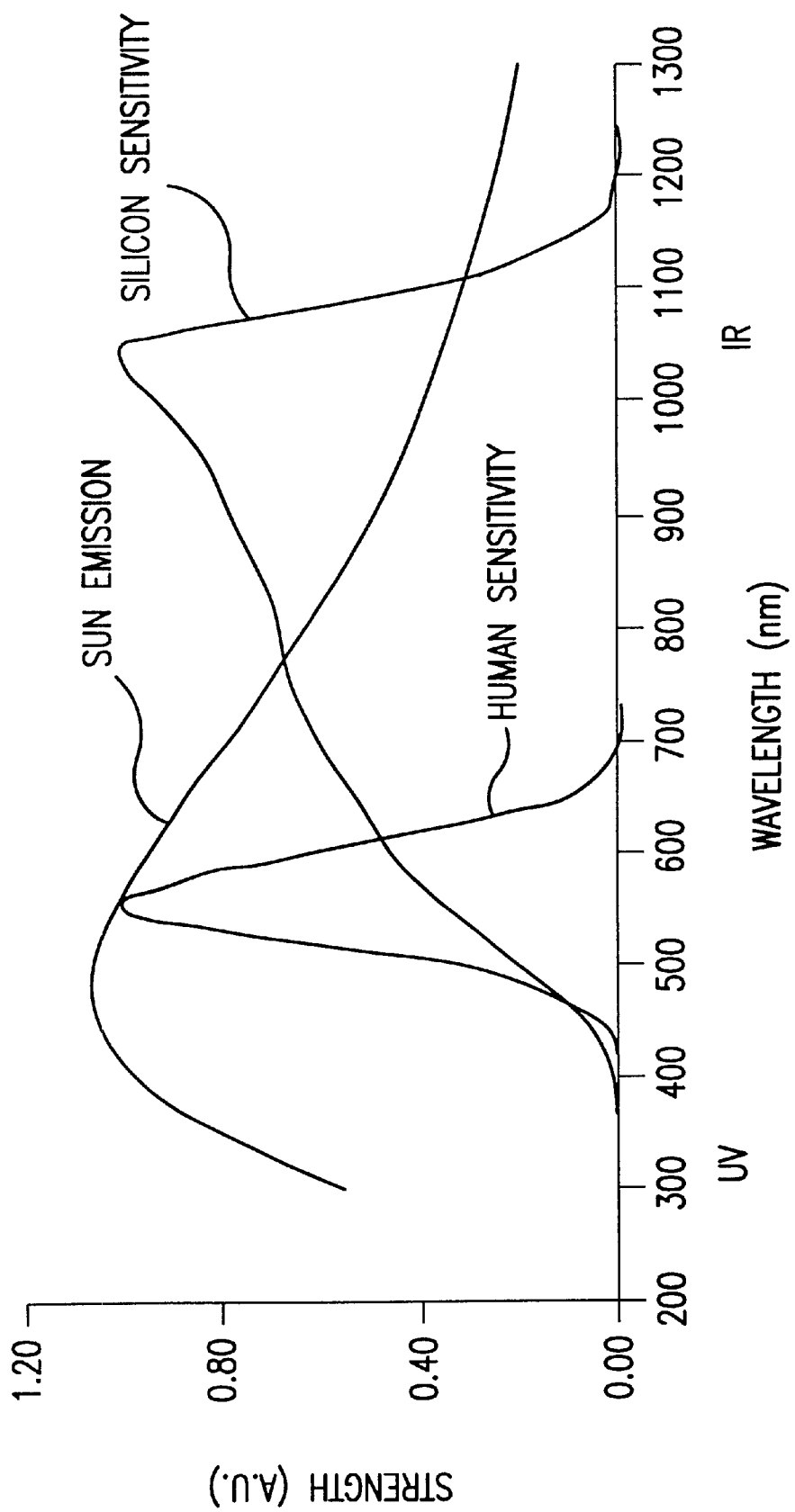
FIG. 11 is a prior art chart of the spectral sensitivity of a typical CCD.

FIG. 6 shows a chart of the typical pass band filters used for the red, green and blue colors in a typical digital camera photo sensor array. The wavelength range of light sampled using the red, green and blue filters is typically between 410 nm and 720 nm. FIG. 7 shows the preferred embodiment of the pass band filter for the infrared filter in accordance with the present invention. In the preferred embodiment, the filter is narrow with the peak centered approximately at 720 nm. In another embodiment the IR filter is broad and has a peak centered approximately at 800 nm (see FIG. 8). In another embodiment there is no filter and light across the entire CCD sensitivity is collected (see FIG. 11). Using the information from the IR element in conjunction with the red, green, and blue elements, the illuminant type can be determined.

Figure 1:
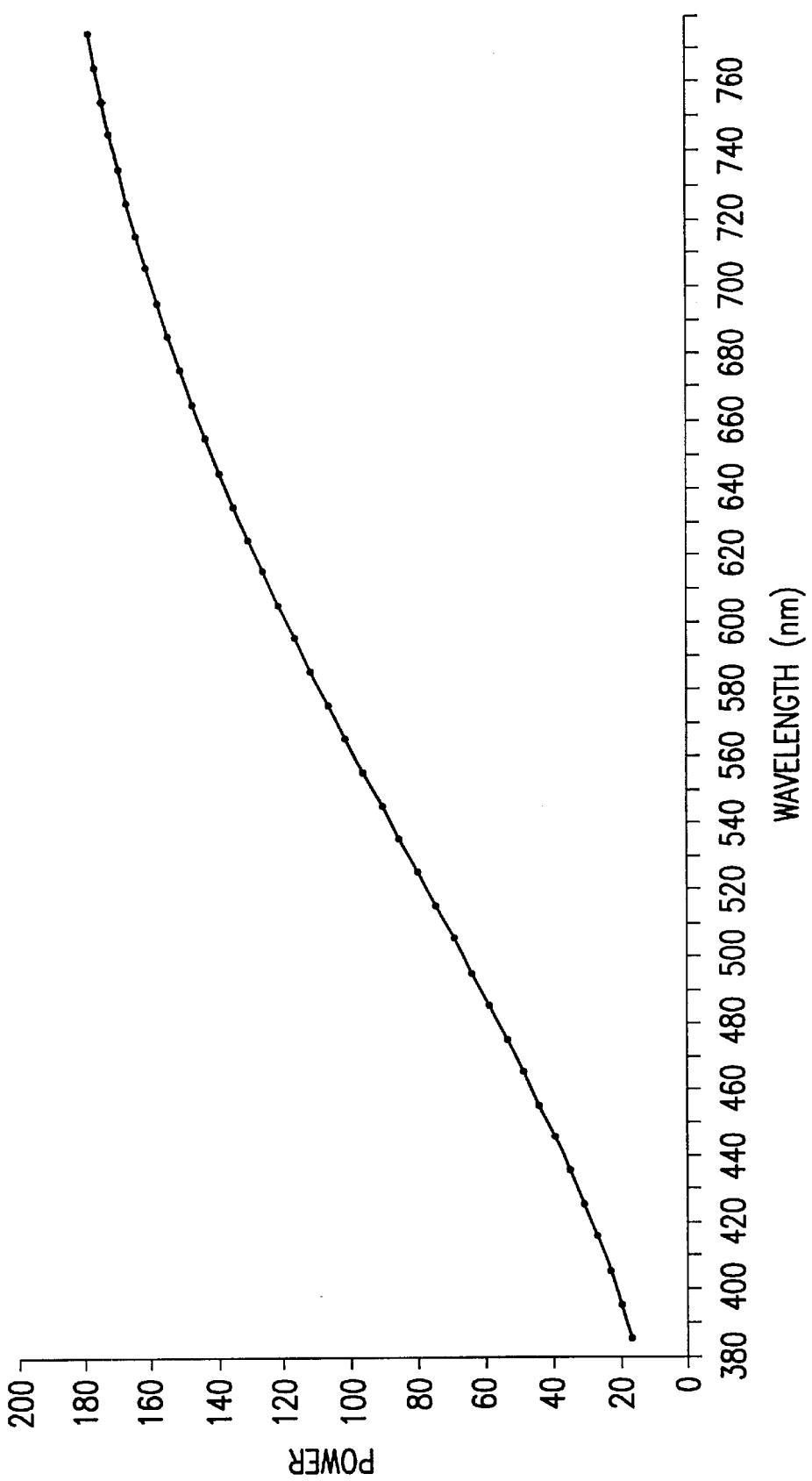
FIG. 1 is a prior art chart of the spectral distribution of power for a tungsten bulb.
Figure 2:
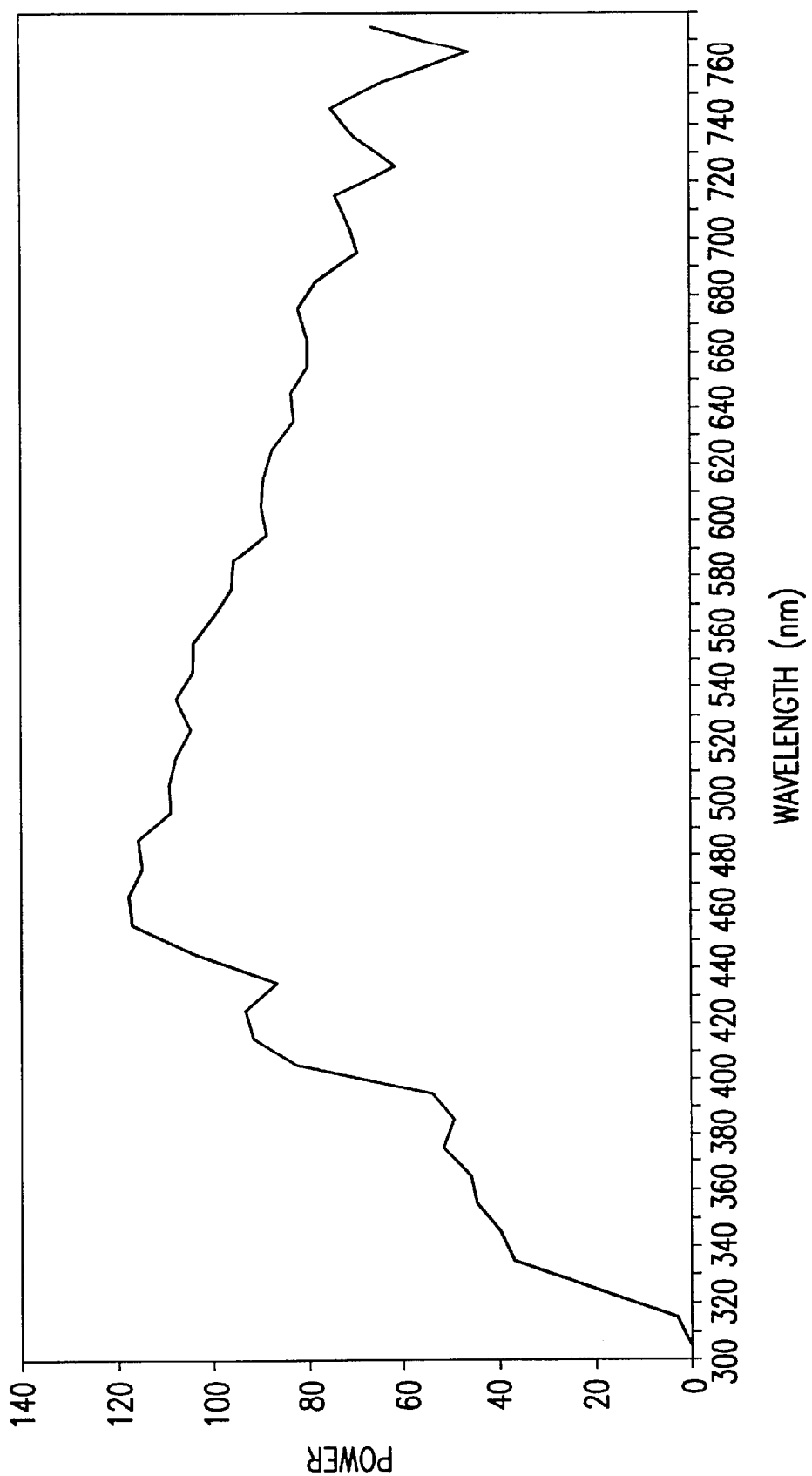
FIG. 2 is a prior art chart of the spectral distribution of power for D65.
Figure 3:
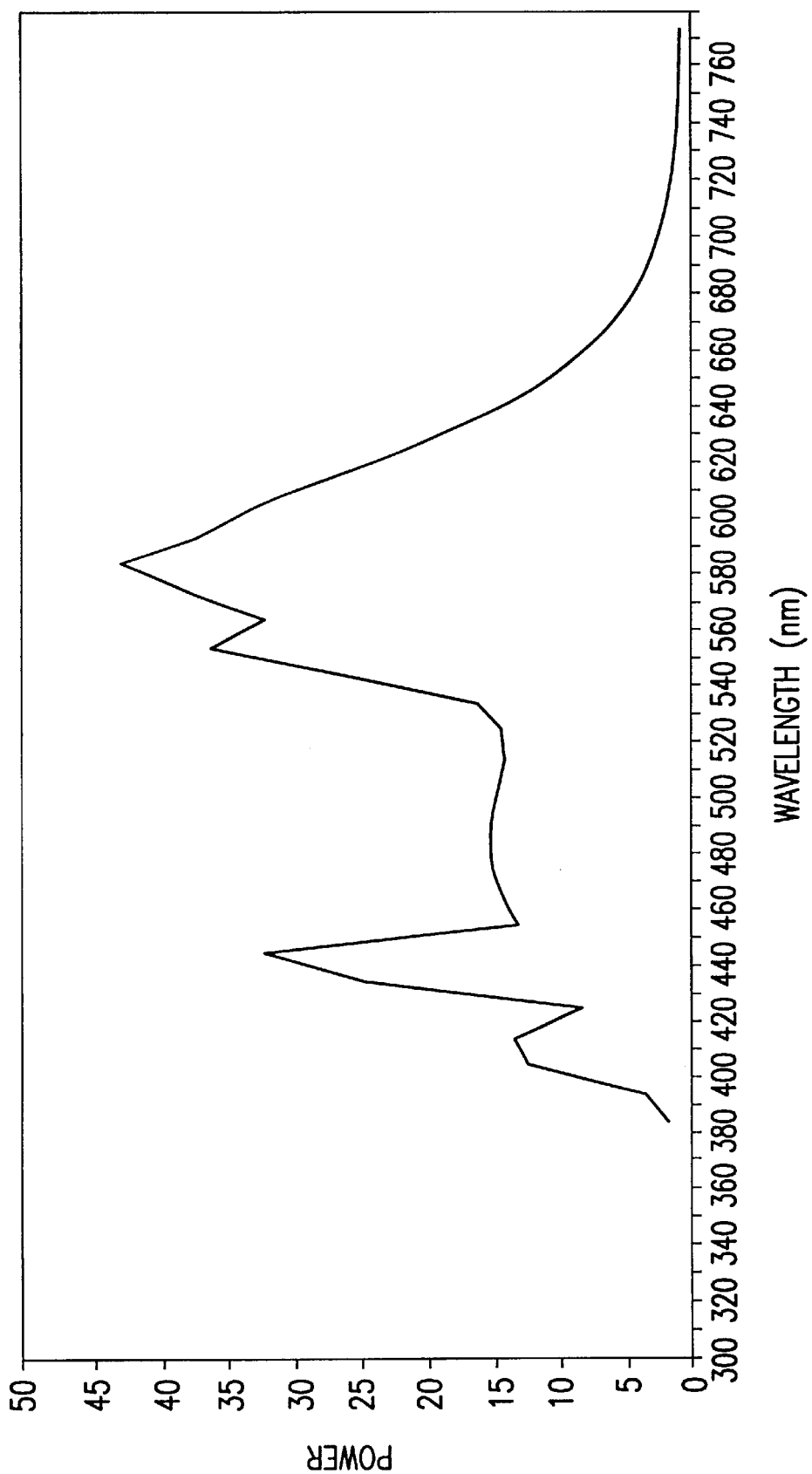
FIG. 3 is a prior art chart of the spectral distribution of power for a florescent bulb.
Figure 9:
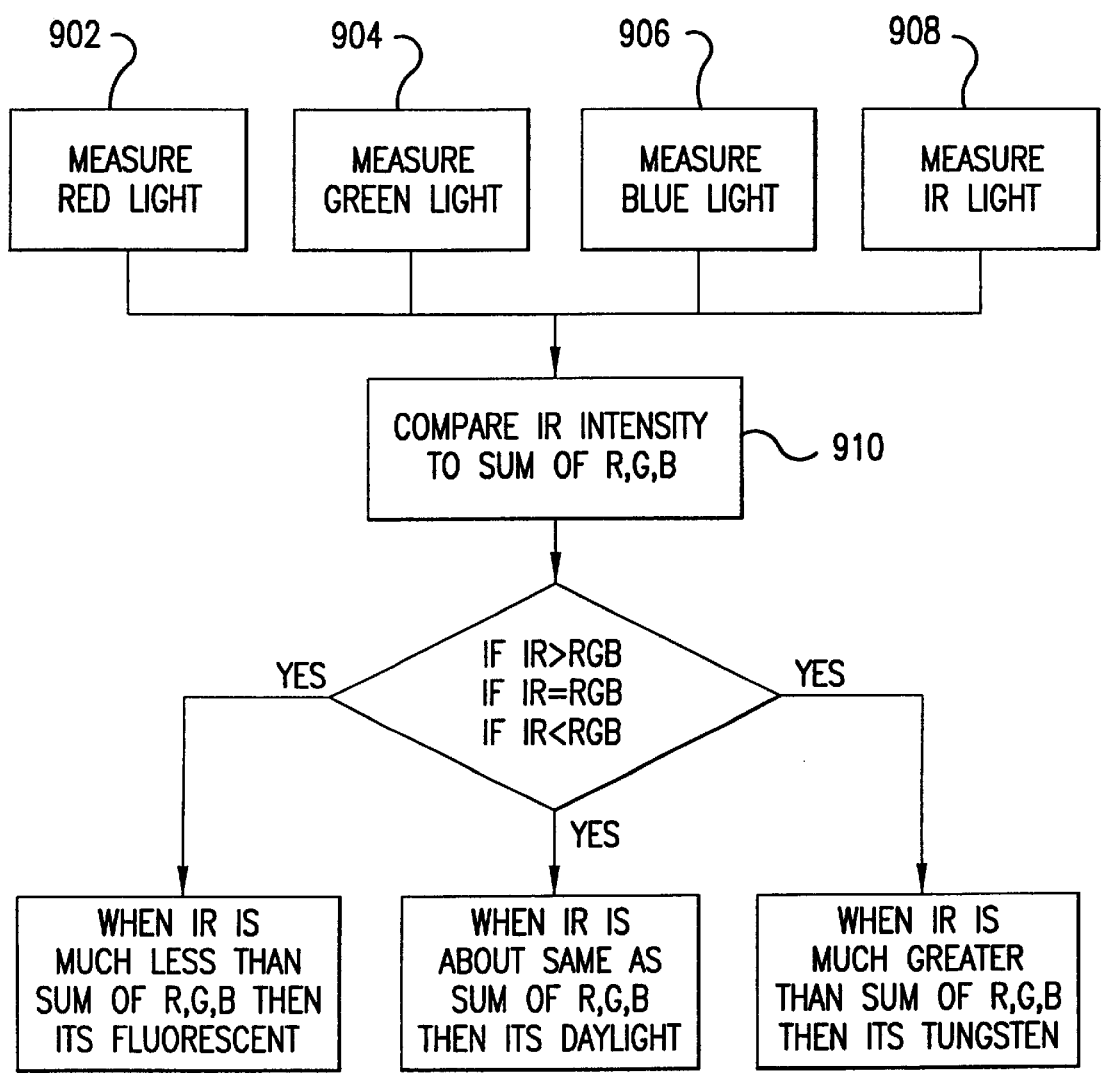
FIG. 9 is a flow chart of the method for determining the illuminant type in a digital image in accordance with the present invention.
Figure 10:
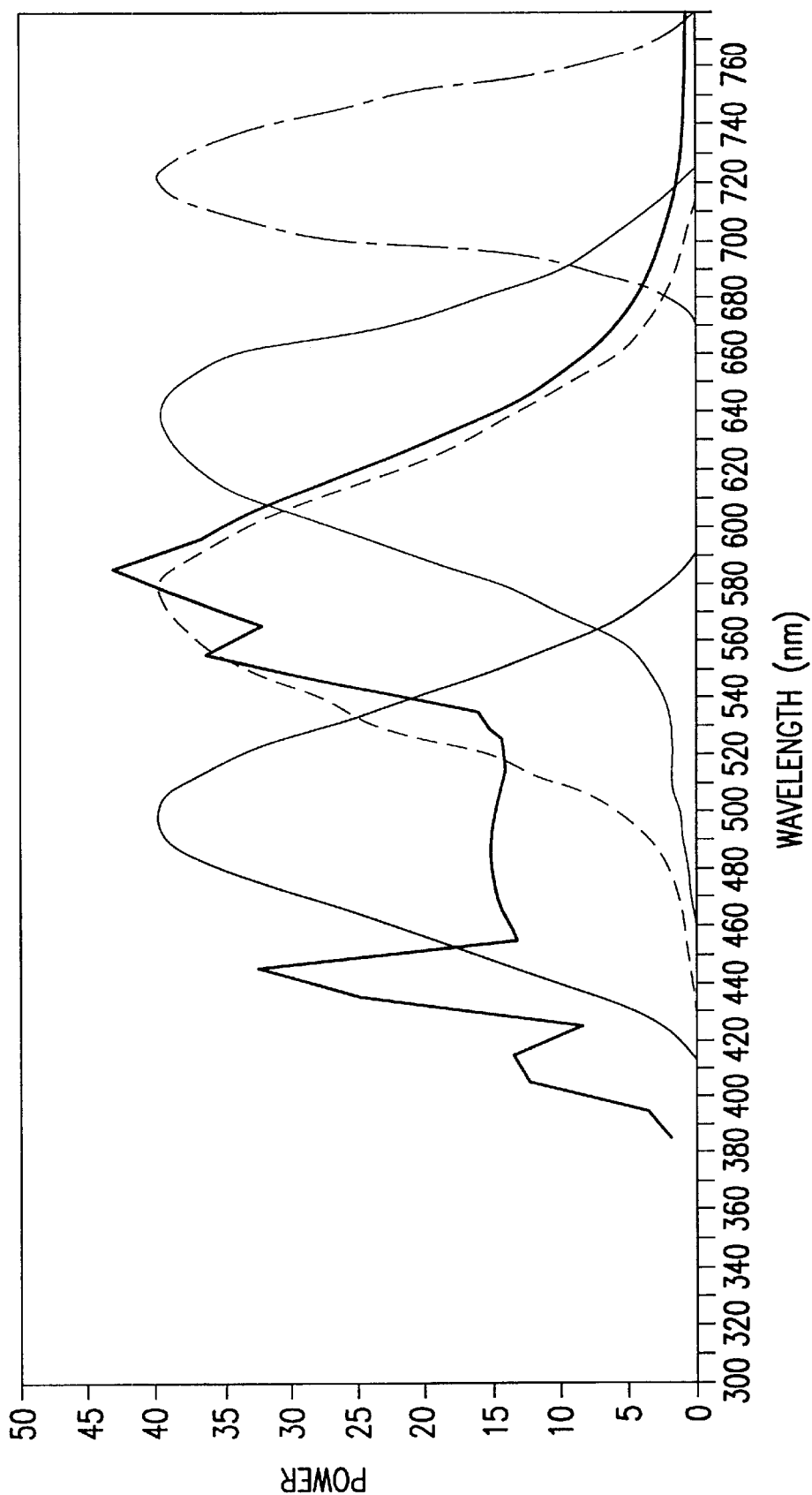
FIG. 10 is a prior art chart of the spectral pass band filters for red, green, blue, and IR overlaid onto the spectral distribution of power for a florescent bulb.

FIG. 9 is a flow chart of the method used to determine the type of illuminant for a digital image of a scene in accordance with the present invention. The first step is to measure the intensity of the red, green, blue, and IR light across the image (902, 904, 906, 908). The intensity of the IR light is then compared to the average intensity of the red, green, and blue light (910). This comparison can be done at each super pixel or it can be done with the sum of the pixels across the entire image. When the intensity of IR light is much smaller than the intensity of the red, green and blue light, the illuminant type will be a light source that creates the light by exciting phosphors that reemit visible light (typically a florescent light). This is because a florescent light does not generate much light in the IR band. FIG. 10 shows the red, green, blue, and IR filter pass bands overlaid onto the power spectrum of a typical florescent light. The intensity of the florescent light in the wavelength range of the IR filter is much smaller than the intensity of the light over the red, green, and blue wavelengths of light. Because the light source is not producing much light in the IR band, the objects in the scene will not reflect much light in this wavelength range. When the intensity of the IR light is approximately the same as the intensity of light in the red, green, and blue wavelength range, the light source will be one of the daylight curves (see FIG. 2). When the intensity of light in the IR band is much greater than the intensity of the red, green and blue light, the illuminant type will be a tungsten source (see FIG. 1). Once the type or class of illuminant source has been determined, the actual source can be more quickly determined using the correlation matrix memory method.

The foregoing description of the present invention has been presented for purposes of illustration and description. It is not intended to be exhaustive or to limit the invention to the precise form disclosed, and other modifications and variations may be possible in light of the above teachings. For example, the IR filter may be placed at a limited number of elements across the photo sensor array or the IR detection may be done on a separate photo sensor array. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method of determining the type of illuminant of a scene, comprising:

measuring the light coming from the scene over a first wavelength band;

measuring the light coming from the scene over a second wavelength band;

measuring the light coming from the scene over a third wavelength band;

measuring the light coming from the scene over a fourth wavelength band, the fourth band including infrared radiation;

determining the type of illuminant for the scene by comparing the intensity of the light in the fourth wavelength band to the intensity of light in the first, second and third wavelength bands.

2. The method of claim 1 where the fourth wavelength band only allows infrared light to pass.

3. A method of determining the illuminant of a scene, comprising:

measuring the red light coming from a scene;

measuring the green light coming from a scene;

measuring the blue light coming from a scene;

measuring the infrared light coming from the scene;

determining the type of illuminant for the scene comparing the intensity of the infrared light to the intensity of red, green and blue light in the scene.

4. The method of claim 2 where the infrared light is measured over a narrow wavelength band.

5. The method of claim 2 where the wavelength band of measured infrared light is centered at 720 nm.

* * * * *